United States Patent [19]
McGee et al.

[11] Patent Number: 5,893,347
[45] Date of Patent: Apr. 13, 1999

[54] METHOD FOR DELIVERING A SMALL QUANTITY OF FUEL WITH A HYDRAULICALLY-ACTUATED INJECTOR DURING SPLIT INJECTION

[75] Inventors: Brian G. McGee; John P. Timmons, both of Chillicothe, Ill.

[73] Assignee: Caterpillar Inc., Peoria, Ill.

[21] Appl. No.: 08/993,994

[22] Filed: Dec. 18, 1997

[51] Int. Cl.$^6$ .................................................. F02B 3/00
[52] U.S. Cl. ........................................ 123/299; 123/496
[58] Field of Search ............................. 123/299, 300, 123/496, 446

[56] References Cited

U.S. PATENT DOCUMENTS

| | | | |
|---|---|---|---|
| Re. 33,270 | 7/1990 | Beck et al. | |
| 4,922,878 | 5/1990 | Shinogle et al. | 123/490 |
| 5,090,379 | 2/1992 | Ito | 123/299 |
| 5,165,373 | 11/1992 | Cheng | 123/300 |
| 5,176,115 | 1/1993 | Campion | 123/179.17 |
| 5,181,494 | 1/1993 | Ausman et al. | 123/446 |
| 5,191,867 | 3/1993 | Glassey | 123/446 |
| 5,331,933 | 7/1994 | Matsushita | 123/300 |
| 5,357,912 | 10/1994 | Barnes et al. | 123/357 |
| 5,359,883 | 11/1994 | Baldwin et al. | 73/117.3 |
| 5,463,996 | 11/1995 | Maley et al. | |
| 5,477,828 | 12/1995 | Barnes | |
| 5,482,016 | 1/1996 | Ohishi et al. | 123/299 |
| 5,485,820 | 1/1996 | Iwaszkiewicz | |
| 5,492,098 | 2/1996 | Hafner et al. | 123/446 |
| 5,492,099 | 2/1996 | Maddock | 123/446 |
| 5,564,391 | 10/1996 | Barnes et al. | 123/446 |
| 5,642,705 | 7/1997 | Morikawa et al. | 123/300 |
| 5,651,345 | 7/1997 | Miller et al. | |
| 5,669,355 | 9/1997 | Gibson et al. | |
| 5,673,669 | 10/1997 | Maley et al. | |
| 5,687,693 | 11/1997 | Chen et al. | |
| 5,697,342 | 12/1997 | Anderson et al. | 123/446 |
| 5,713,328 | 2/1998 | Anderson et al. | 123/299 |
| 5,717,562 | 2/1998 | Antone et al. | 361/155 |
| 5,732,674 | 3/1998 | Motoyama et al. | 123/299 |

OTHER PUBLICATIONS

Tow et al.; SAE Technical Paper Series: Reducing Particulate and $NO_x$ Emissions by Using Multiple Injections in a Heavy Duty D.I. Diesel Engine; Feb. 28, 1994.

Beck et al.; SAE Technical Paper Series: Injection Rate Shaping and High Speed Combustion Analysis–New Tools for Diesel Engine Combustion Development; Feb. 26, 1990.

Gibson et al.; Off Highway Engineering: Next–generation fuel system; Aug. 1996; pp. 7–11.

*Primary Examiner*—Thomas N. Moulis

[57] ABSTRACT

A method for apportioning a total fuel quantity to be injected to an engine by a hydraulically-actuated injector between a pilot shot and a main shot includes determining a pilot shot and/or main shot fuel quantity desired to be delivered during injection. The desired pilot shot fuel quantity is compared with a threshold pilot shot fuel quantity and/or the desired main shot fuel quantity is compared with a threshold main shot fuel quantity. The total fuel quantity is delivered by a pilot shot if the desired pilot shot fuel quantity is less than the threshold pilot shot fuel quantity and/or the desired main shot fuel quantity is less than the threshold main shot fuel quantity.

17 Claims, 3 Drawing Sheets

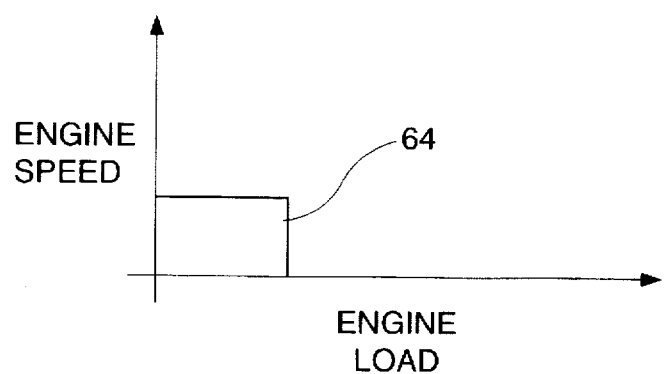
Fig_2_
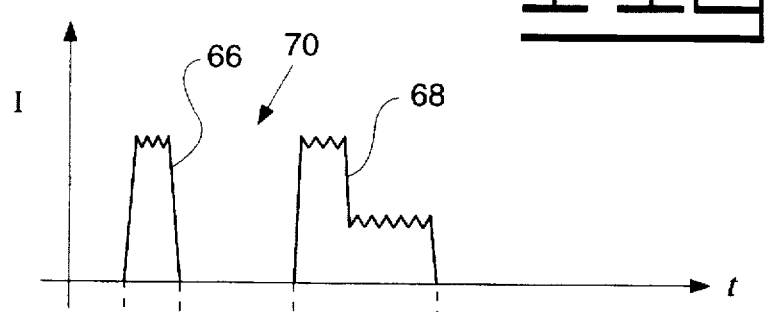
Fig_3_
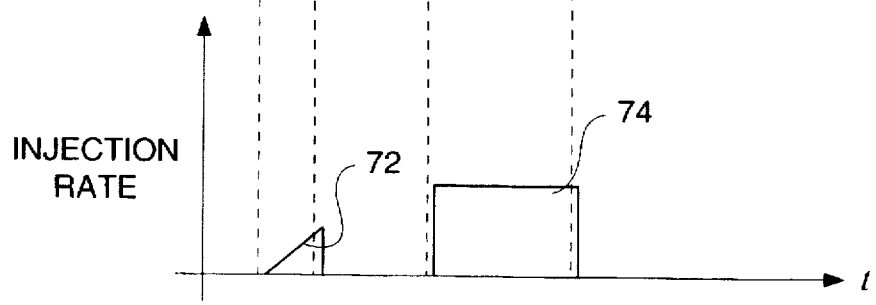
Fig_4_

METHOD FOR DELIVERING A SMALL QUANTITY OF FUEL WITH A HYDRAULICALLY-ACTUATED INJECTOR DURING SPLIT INJECTION

TECHNICAL FIELD

This invention relates generally to hydraulically-actuated fuel injection systems, and more particularly, to an electronic control system and method for controlling fuel injection during split injection engine operating conditions so as to enable accurate delivery of a small quantity of fuel to the engine.

BACKGROUND ART

During certain engine operating conditions it is desirable to inject fuel using a split injection technique in which a portion of the total fuel to be delivered to the engine cylinder is injected by what is commonly termed a pilot shot or prime shot and in which the remaining portion of the fuel is injected by what is commonly termed a main shot. For example, it is known to utilize such a split injection technique at engine operating conditions including low engine speed and low engine load. In the past the controllability of such split injection has been somewhat restricted by mechanical limitations of the hydraulically-actuated injectors utilized. For example, some injectors have been limited in that the pilot or prime shot was mechanically controlled and therefore both a pilot shot and a main shot always occurred. Even with a more advanced hydraulically-actuated electronically-controlled injector, during certain engine operating conditions the quantity of fuel desired to be delivered to the engine can be relatively small. It is sometimes difficult to accurately control delivery of such small amounts of fuel, even utilizing current control signals.

Accordingly, the present invention is directed to overcoming one or more of the problems as set forth above.

DISCLOSURE OF THE INVENTION

In one aspect of the present invention a method for apportioning a total fuel quantity to be injected to an engine by a hydraulically-actuated injector between a pilot shot and a main shot is provided. The method includes determining a pilot shot and/or main shot fuel quantity desired to be delivered during injection. The desired pilot shot fuel quantity is compared with a threshold pilot shot fuel quantity and/or the desired main shot fuel quantity is compared with a threshold main shot fuel quantity. The total fuel quantity is delivered by a pilot shot if the desired pilot shot fuel quantity is less than the threshold pilot shot fuel quantity and/or the desired main shot fuel quantity is less than the threshold main shot fuel quantity. A fuel injection control system which operates in accordance with the inventive method is also provided.

The pilot shot may be a ramped fuel delivery which allows for more accurate control of delivery of small amounts of fuel to the engine, the premise behind the invention being that delivery of the total fuel quantity by a pilot shot will provide more accurate and repeatable fuel delivery as the total fuel quantity to be delivered approaches zero.

BRIEF DESCRIPTION OF DRAWINGS

FIG. 2 is a graph of engine speed verses engine load;

FIG. 4 is a graph of fuel injection rate as delivered by the split injection current waveform of FIG. 3; and FIG. 5 is a flowchart of operating steps in accordance with the present invention.

BEST MODE FOR CARRYING OUT OF INVENTION

Figure 1:
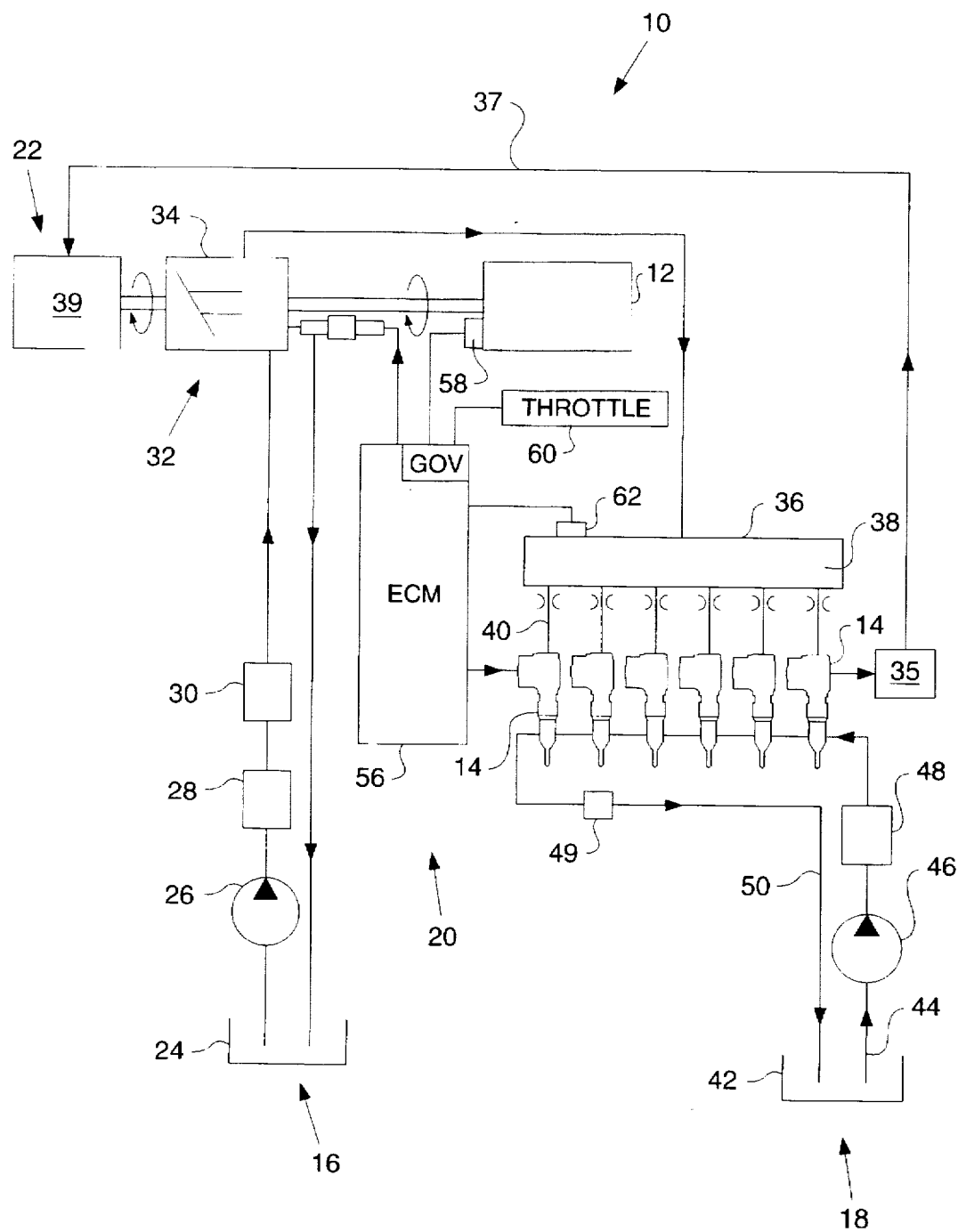
FIG. 1 is a diagrammatic general schematic view of a hydraulically-actuated electronically-controlled injector fuel system for an engine having a plurality of injectors.

Referring to FIG. 1, there is shown a hydraulically-actuated electronically-controlled fuel injector system 10 (hereinafter referred to as HEUI-B fuel system). Typical of such systems are those shown and described in U.S. Pat. No. 5,463,996, U.S. Pat. No. 5,669,355, U.S. Pat. No. 5,673,669, U.S. Pat. No. 5,687,693, and U.S. Pat. No. 5,697,342. The exemplary HEUI-B fuel system is shown in FIG. 1 as adapted for a direct-injection diesel-cycle internal combustion engine 12.

HEUI-B fuel system 10 includes one or more hydraulically-actuated electronically-controlled injectors 14, such as unit fuel injectors, each adapted to be positioned in a respective cylinder head bore of engine 12. The system 10 further includes apparatus or means 16 for supplying hydraulic actuating fluid to each injector 14, apparatus or means 18 for supplying fuel to each injector, apparatus or means 20 for electronically controlling the manner in which fuel is injected by injectors 14, including timing, number of injections, and injection profile, and actuating fluid pressure of the HEUI-B fuel system 10 independent of engine speed and load. Apparatus or means 22 for recirculating or recovering hydraulic energy of the hydraulic actuating fluid supplied to injectors 14 is also provided.

Hydraulic actuating fluid supply means 16 preferably includes an actuating fluid sump 24, a relatively low pressure actuating fluid transfer pump 26, an actuating fluid cooler 28, one or more actuating fluid filters 30, a source or means 32 for generating relatively high pressure actuating fluid, such as a relatively high pressure actuating fluid pump 34, and at least one relatively high pressure fluid manifold 36. The actuating fluid is preferably engine lubricating oil. Alternatively the actuating fluid could be fuel.

Apparatus 22 may include a waste actuating fluid control valve 35 for each injector, a common recirculation line 37, and a hydraulic motor 39 connected between the actuating fluid pump 34 and recirculation line 37.

Actuating fluid manifold 36, associated with injectors 14, includes a common rail passage 38 and a plurality of rail branch passages 40 extending from common rail 38 and arranged in fluid communication between common rail 38 and actuating fluid inlets of respective injectors 14. Common rail passage 38 is also arranged in fluid communication with the outlet from high pressure actuating fluid pump 34.

Fuel supplying means 18 includes a fuel tank 42, a fuel supply passage 44 arranged in fluid communication between fuel tank 42 and a fuel inlet of each injector 14, a relatively low pressure fuel transfer pump 46, one or more fuel filters 48, a fuel supply regulating valve 49, and a fuel circulation and return passage 50 arranged in fluid communication between injectors 14 and fuel tank 42. The various fuel passages may be provided in a manner commonly know in the art.

Electronic controlling means 20 preferably includes an electronic control module (ECM) 56, the use of which is well known in the art. ECM 56 typically includes processing means such as a microcontroller or microprocessor, a governor (GOV) such as a proportional integral derivative (PID) controller for regulating engine speed, and circuitry including input/output circuitry and the like. ECM 56 may be used to control fuel injection timing, fuel quantity injected, fuel injection pressure, number of separate injections per injection cycle, time intervals between injection segments, and fuel quantity injected by each injection segment. Each of such parameters are variably controllable independent of engine speed and load.

Associated with a camshaft of engine 12 is an engine speed sensor 58 which produces speed indicative signals. Engine speed sensor 58 is connected to the governor of ECM 56 for monitoring of the engine speed and piston position for timing purposes. A throttle 60 is also provided and produces signals indicative of a desired engine speed, throttle 60 also being connected to the governor of ECM 56. An actuating fluid pressure sensor 62 for sensing the pressure within common rail 38 and producing pressure indicative signals is also connected to ECM 56 which utilizes such signals for maintaining or adjusting the actuating fluid pressure.

Each of the injectors 14 is preferably of a type such as that shown and described in one of U.S. Pat. No. 5,463,996, U.S. Pat. No. 5,669,355, U.S. Pat. No. 5,673,669, U.S. Pat. No. 5,687,693, and U.S. Pat. No. 5,697,342. However, it is recognized that the present invention could be utilized in association with other variations of hydraulically-actuated electronically-controlled injectors.

Given HEUI-B fuel system 10, it is recognized that the type of injection desired will typically vary depending upon various engine operating conditions. Referring to FIG. 2, a graph of engine speed verses engine load is shown, illustrating that at relatively low engine speeds and relatively low engine loads, as indicated by region 64, it is often desirable to utilize what is commonly referred to as a split injection technique, wherein a portion of the total fuel to be delivered to the engine cylinder is injected by what is commonly termed a pilot shot or prime shot and in which the remaining portion of the fuel is injected by what is commonly termed a main shot. Such split injection can provide advantages in terms of exhaust emissions, including reduced particulate emissions and/or reduced $NO_x$ emissions.

Figure 3:
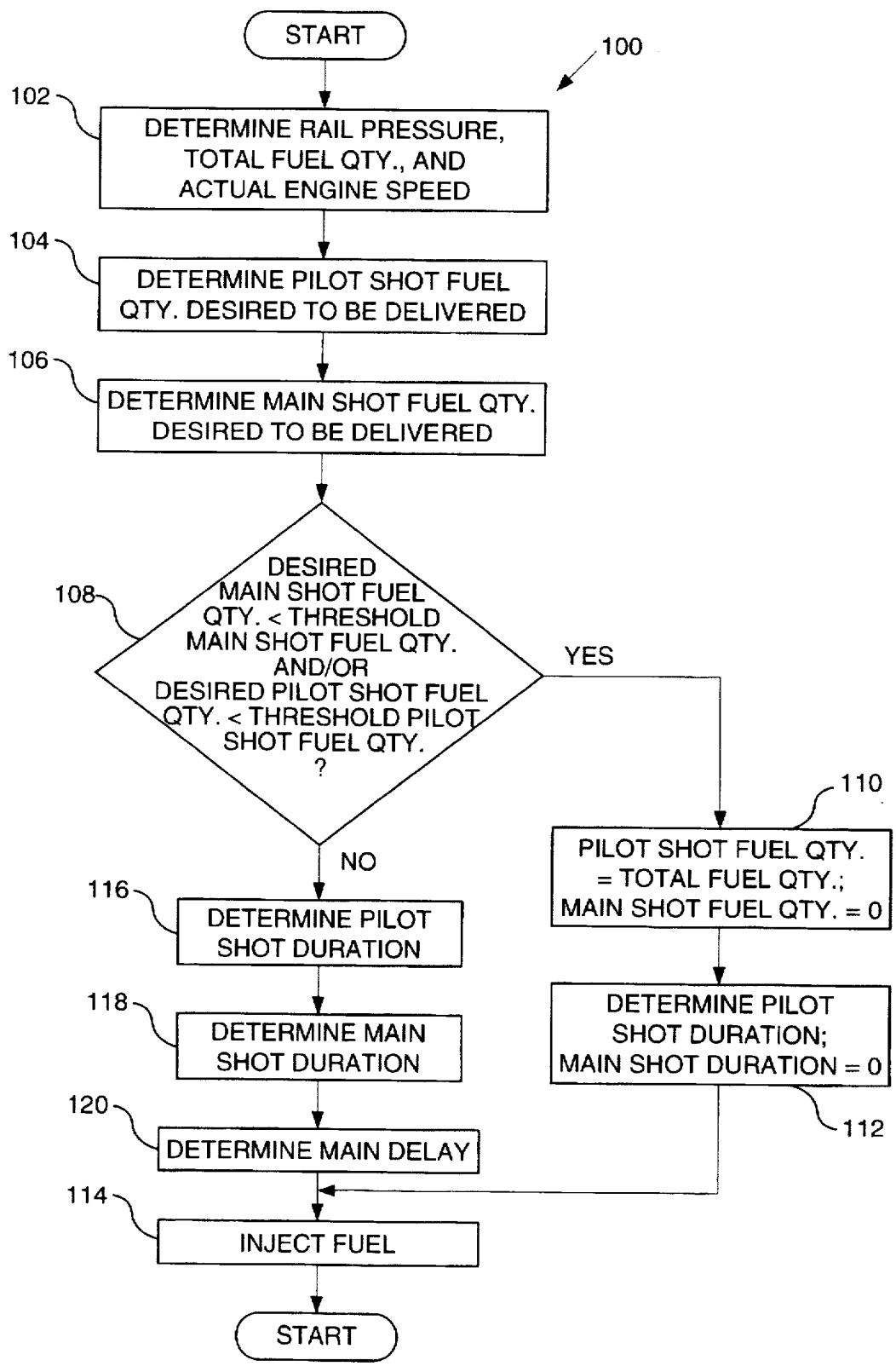
FIG. 3 is a graph of a typical split injection current waveform delivered to a hydraulically-actuated injector during split injection engine operating conditions.

An exemplary current waveform for such split injection is illustrated in FIG. 3 showing a prime shot control signal 66 and a main shot control signal 68, with a delay 70 therebetween. The duration of each of control signals 66 and 68 can be varied by ECM 56, and the duration of delay 70 can also be varied by ECM 56. Referring to FIG. 4, a graph of the fuel injection rate verses time for the split injection control signals of FIG. 3 is shown. The injection rate resulting from the pilot shot increases in a ramped manner as shown at 72 because the fuel within the injector is being pressurized during the pilot shot control signal by movement of a plunger within the injector. The injection rate resulting from the main shot is higher and relatively constant as shown at 74 because, even after the pilot shot control signal ceases, plunger movement within the injector continues due to inertia and the fuel is further compressed while a check valve at the injector nozzle remains closed so that no fuel is introduced into the cylinder. The quantity of fuel delivered during each of pilot shot control signal 66 and main shot control signal 68 is represented by the area of respective regions 72 and 74. In order to accurately deliver specific fuel quantities, opening and closing of the injectors must be accurately controlled by control signals 66 and 68. As shown in FIG. 4 there will be some time lag between when control signals 66 and 68 are turned on and off and when injection begins and stops. Therefore, there will occasionally be some difficulty encountered in accurately delivering fuel quantities as the total fuel quantity to be injected approaches zero, such as at very low engine speeds and very low engine loads. It can be seen from FIG. 4 that the pilot shot can be utilized to accurately deliver smaller quantities of fuel than can the main shot because the injection rate is generally lower. It is this aspect of split injection which is advantageously utilized in the present invention.

Operating steps in accordance with one embodiment of the present invention are set forth in flowchart 100 of FIG. 5. The rail pressure, total fuel quantity, and actual engine speed are determined as indicated at step 102. The rail pressure determination is based upon one or more signals from actuating fluid pressure sensor 62; the total fuel quantity is the fuel rate output by the governor; and the actual engine speed determination is based upon one or more signals from engine speed sensor 58. A pilot shot fuel quantity desired to be delivered during the injection cycle is determined at step 104 and the main shot fuel quantity desired to be delivered during the injection cycle is determined at step 106. The desired pilot shot fuel quantity may be calculated, or looked up in a map, as a function of engine speed and engine load, where the engine load indicator utilized may be the rail pressure, the total fuel quantity, or some other engine load indicator. The desired main shot fuel quantity may then be determined as the difference between the total fuel quantity and the desired pilot shot fuel quantity.

A comparison of the desired main shot fuel quantity to a threshold main shot fuel quantity and/or of the desired pilot shot fuel quantity to a threshold pilot shot fuel quantity is then made at step 108. In this regard it is anticipated that the threshold main shot fuel quantity should be representative of a minimum fuel quantity which can accurately be delivered by a main shot control signal and the threshold pilot shot fuel quantity should be representative of a minimum fuel quantity which can accurately be delivered by a pilot shot control signal. Such fuel quantities will typically vary with the rail pressure and with the fuel delivery characteristics of the particular injector being utilized. Accordingly, the threshold main shot and threshold pilot shot fuel quantities may be calculated, or looked up in respective maps, as a function of rail pressure. Such maps could be determined based upon bench testing of the injector. If the desired main shot fuel quantity is less than the threshold main shot fuel quantity and/or the desired pilot shot fuel quantity is less than the threshold pilot shot fuel quantity, then the pilot shot fuel quantity to be delivered for such injection cycle is set to the total fuel quantity and the main shot fuel quantity for such injection cycle is set to zero at step 110. The pilot shot duration is determined and the main shot duration is set to zero at step 112. The pilot shot duration may be calculated, or looked up in a map, as a function of the rail pressure and the total fuel quantity. Fuel injection then takes place at step 114 with the total fuel quantity being delivered by a pilot shot utilizing a pilot shot control signal of appropriate duration.

If neither the desired main shot fuel quantity nor the desired pilot shot fuel quantity are less than the threshold main shot and threshold pilot shot fuel quantities respectively, injection takes place as is normal for split injection. In particular, the pilot shot duration being determined at step 116, the main shot duration being determined at step 118, the delay between the pilot shot and main shot being determined at step 120, and fuel injection being affected by appropriate control signals at stop 114. It is anticipated that the pilot shot duration and main shot duration will be calculated, or looked up in respective maps, as a function of rail pressure and respective fuel quantities.

Industrial Applicability

Utilization of an injection method or system in accordance with the present invention provides for more accurate delivery of small fuel quantities during split injection engine operating conditions. In particular, if a determination is made during split injection that either the desired main shot fuel quantity and/or the desired pilot shot fuel quantity cannot be accurately delivered, the total fuel quantity is delivered by a pilot shot. Although the pilot shot is a ramped injection, the timing associated with a split injection is maintained. Delivering the total fuel quantity by a pilot shot enables more accurate injection of small quantities of fuel due to the lower initial injection rate provided by the pilot shot as explained above with respect to FIG. 4. Such accuracy enables a more continuous and repeatable delivery of the total fuel quantity, thus preventing a rough idle situation.

It is anticipated that rather than directly comparing the desired pilot shot fuel quantity and/or desired main shot fuel quantities with minimum or threshold fuel quantities in step 108, the pilot shot duration and main shot duration could first be determined. Such durations, being values which are indicative of fuel quantities desired to be delivered, could be compared with respective threshold duration values which are also indicative of fuel quantities.

Although fuel system 10 has been shown as a six injector system, it is recognized that the present invention could be incorporated in fuel injection systems including any number of fuel injectors including, for example, two, four and eight injector systems. It is also recognized that flowchart 100 is merely representative of one manner of organizing the steps of the present invention and that other variations could be utilized without departing from the spirit of the present invention.

Other aspects, objects and advantages of the present invention can be obtained from a study of the drawings, the disclosure and the appended claims.

We claim:

1. A method for controlling injection of a total fuel quantity to an engine by a hydraulically-actuated injector during split injection engine operating conditions, the method comprising the steps of:

determining a main shot fuel quantity desired to be delivered during injection;

comparing the desired main shot fuel quantity with a threshold main shot fuel quantity; and delivering the total fuel quantity by a pilot shot if the desired main shot fuel quantity is less than the threshold main shot fuel quantity.

2. The method, as set forth in claim 1, including the steps of:

determining a pilot shot fuel quantity desired to be delivered during injection;

comparing the desired pilot shot fuel quantity with a threshold pilot shot fuel quantity; and delivering the total fuel quantity by a pilot shot if the desired pilot shot fuel quantity is less than the threshold pilot shot fuel quantity.

3. The method, as set forth in claim 2, including the steps of:

sensing an engine speed;

determining the desired pilot shot fuel quantity as a function of at least the sensed engine speed and an engine load; and determining the desired main shot fuel quantity as a difference between the total fuel quantity and the desired pilot shot fuel quantity.

4. The method, as set forth in claim 3, including the step of:

sensing a rail pressure associated with an injector actuating fluid and using the sensed rail pressure as an engine load indicator in determining the desired pilot shot fuel quantity.

5. The method, as set forth in claim 3, including the step of:

using the total fuel quantity as an engine load indicator in determining the desired pilot shot fuel quantity.

6. The method, as set forth in claim 1, including the steps of:

sensing a rail pressure associated with an injector actuating fluid;

determining a pilot shot duration as a function of at least the sensed rail pressure and the total fuel quantity; and delivering a pilot shot control signal to the hydraulically-actuated injector such that the pilot shot is of the determined pilot shot duration.

7. The method, as set forth in claim 1, including the step of:

sensing a rail pressure associated with an injector actuating fluid and determining the threshold main shot fuel quantity as a function of at least the sensed rail pressure.

8. The method, as set forth in claim 7, wherein the threshold main shot fuel quantity represents a minimum amount of fuel which can accurately be delivered by a main shot.

9. The method, as set forth in claim 1, wherein the pilot shot is a ramped delivery of fuel.

10. A method for apportioning a total fuel quantity to be injected to an engine by a hydraulically-actuated injector between a pilot shot and a main shot, the method comprising the steps of:

determining a value indicative of a pilot shot fuel quantity desired to be delivered during injection;

comparing the value indicative of the desired pilot shot fuel quantity with a threshold pilot shot fuel quantity indicative value; and delivering the total fuel quantity by a pilot shot if the value indicative of the desired pilot shot fuel quantity is less than the threshold pilot shot fuel quantity indicative value.

11. The method, as set forth in claim 10, including the steps of:

determining a value indicative of a main shot fuel quantity desired to be delivered during injection;

comparing the value indicative of the desired main shot fuel quantity with a threshold main shot fuel quantity indicative value; and delivering the total fuel quantity by a pilot shot if the value indicative of the desired main shot fuel quantity is less than the threshold main shot fuel quantity indicative value.

12. The method, as set forth in claim 11, wherein the value indicative of the desired pilot shot fuel quantity is a desired pilot shot duration, and wherein the value indicative of the desired main shot fuel quantity is a desired main shot duration.

13. The method, as set forth in claim 11, including the steps of:

sensing a rail pressure associated with an injector actuating fluid;

determining the threshold pilot shot fuel quantity indicative value as a function of at least the sensed rail pressure; and determining the threshold main shot fuel quantity indicative value as a function of at least the sensed rail pressure.

14. The method, as set forth in claim 13, wherein the threshold pilot shot fuel quantity indicative value represents a minimum amount of fuel which can accurately be delivered by a pilot shot and wherein the threshold main shot fuel quantity indicative value represents a minimum amount of fuel which can accurately be delivered by a main shot.

15. A fuel injection control system for apportioning a total fuel quantity to be injected to an engine by a hydraulically-actuated injector between a pilot shot and a main shot, comprising:

an injector actuating fluid pressure sensor;

an engine speed sensor;

an electronic controller connected to the hydraulically-actuated injector, the engine speed sensor, and the injector actuating fluid pressure sensor;

wherein the electronic controller is operable to determine a pilot shot fuel quantity desired to be delivered during injection and a main shot fuel quantity desired to be delivered during injection;

wherein the electronic controller is operable to compare the desired pilot shot fuel quantity with a threshold pilot shot fuel quantity and to compare the desired main shot fuel quantity with a threshold main shot fuel quantity; and wherein the electronic controller is operable to apportion one hundred percent of the total fuel quantity to the pilot shot if at least one of the following conditions exist:

(i) the desired pilot shot fuel quantity is less than the threshold pilot shot fuel quantity;

(ii) the desired main shot fuel quantity is less than the threshold main shot fuel quantity.

16. The fuel injection control system, as set forth in claim 15, wherein the electronic controller is operable to determine the desired pilot shot fuel quantity as a function of at least engine speed and rail pressure.

17. The fuel injection control system, as set forth in claim 15, wherein the electronic controller is operable to determine the threshold pilot shot fuel quantity as a function of at least the rail pressure and is operable to determine the threshold main shot fuel quantity as a function of at least the rail pressure.

* * * * *